(12) United States Patent
Masuda et al.

(10) Patent No.: US 8,915,651 B2
(45) Date of Patent: Dec. 23, 2014

(54) WHEEL ROLLING BEARING DEVICE

(71) Applicant: Jtekt Corporation, Osaka-shi (JP)

(72) Inventors: Yoshinori Masuda, Yamatotakada (JP); Tatsuya Yokota, Tsu (JP)

(73) Assignee: Jtekt Corporation, Osaka-shi (JP)

( * ) Notice: Subject to any disclaimer, the term of this patent is extended or adjusted under 35 U.S.C. 154(b) by 38 days.

(21) Appl. No.: 13/740,885

(22) Filed: Jan. 14, 2013

(65) Prior Publication Data
US 2013/0182984 A1    Jul. 18, 2013

(51) Int. Cl.
| | |
|---|---|
| *F16C 13/00* | (2006.01) |
| *B60B 27/00* | (2006.01) |
| *F16C 19/18* | (2006.01) |
| *F16C 33/64* | (2006.01) |
| *F16C 33/58* | (2006.01) |
| *B21K 1/40* | (2006.01) |
| *F16C 33/78* | (2006.01) |

(52) U.S. Cl.
CPC ......... *B60B 27/0005* (2013.01); *F16C 2220/46* (2013.01); *F16C 2240/60* (2013.01); *F16C 2326/02* (2013.01); *F16C 19/186* (2013.01); *B60B 27/0073* (2013.01); *F16C 33/64* (2013.01); *F16C 33/586* (2013.01); *B60B 27/00* (2013.01); *B21K 1/40* (2013.01); *F16C 33/7886* (2013.01); *F16C 33/7826* (2013.01)
USPC ...................................................... 384/544

(58) Field of Classification Search
USPC ............................ 384/477, 481, 484, 544, 589
See application file for complete search history.

(56) References Cited

U.S. PATENT DOCUMENTS

| | | | |
|---|---|---|---|
| 3,944,305 A | | 3/1976 | Asberg |
| 4,040,683 A | | 8/1977 | Korenhof |
| 4,047,770 A | * | 9/1977 | Korenhof et al. ............. 384/482 |
| 5,454,647 A | * | 10/1995 | Otto .............................. 384/486 |

(Continued)

FOREIGN PATENT DOCUMENTS

| | | |
|---|---|---|
| DE | 10 2007 050 215 A1 | 4/2009 |
| EP | 1 944 518 A1 | 7/2008 |

(Continued)

OTHER PUBLICATIONS

Extended European Search Report issued in European Patent Application No. 13151403.6 dated Jun. 17, 2013.

*Primary Examiner* — James Pilkington
(74) *Attorney, Agent, or Firm* — Oliff PLC (57) ABSTRACT

An inner ring member having multiple flange portions is formed by cold forging. A tapered surface is formed in a state of a forged surface on the inner ring member so as to gradually increase in diameter from an inner side toward an outer side in a vehicle lateral direction over a region from a position near root portions of inner side faces of the flange portions in the vehicle lateral direction to a position radially outward of an outer periphery of an outer end portion of an outer ring member in the vehicle lateral direction. A seal member is attached to the outer periphery of the outer end portion of the outer ring member. A seal lip that is in sliding contact with the tapered surface in the state of a forged surface is formed at a distal end portion of the seal member.

2 Claims, 5 Drawing Sheets

INNER SIDE IN ⟵⟶ OUTER SIDE IN
VEHICLE LATERAL        VEHICLE LATERAL
DIRECTION              DIRECTION

(56) References Cited

U.S. PATENT DOCUMENTS

| | | | |
|---|---|---|---|
| 5,494,358 A * | 2/1996 | Dougherty | 384/448 |
| 7,614,795 B2 * | 11/2009 | Adachi et al. | 384/484 |
| 7,618,191 B2 * | 11/2009 | Haepp et al. | 384/448 |
| 2006/0117903 A1 | 6/2006 | Kobayashi et al. | |
| 2007/0076994 A1 | 4/2007 | Norimatsu et al. | |
| 2007/0230853 A1* | 10/2007 | Inoue et al. | 384/589 |
| 2009/0252445 A1* | 10/2009 | Yamashita et al. | 384/477 |
| 2010/0046876 A1* | 2/2010 | Murakami et al. | 384/544 |

FOREIGN PATENT DOCUMENTS

| | | |
|---|---|---|
| JP | A-2003-025803 | 1/2003 |
| JP | A-2005-289147 | 10/2005 |
| JP | A-2006-111070 | 4/2006 |
| JP | A-2010-188829 | 9/2010 |
| JP | A-2010-241188 | 10/2010 |

* cited by examiner

WHEEL ROLLING BEARING DEVICE

INCORPORATION BY REFERENCE

The disclosure of Japanese Patent Application No. 2012-006831 filed on Jan. 17, 2012 including the specification, drawings and abstract, is incorporated herein by reference in its entirety.

BACKGROUND OF THE INVENTION

1. Field of the Invention

The invention relates to a wheel rolling bearing device.

2. Description of Related Art

There is a wheel rolling bearing device that is configured to include an inner ring member, an outer ring member and a plurality of rolling elements. The inner ring member has a shaft portion, and a plurality of flange portions is formed on the outer periphery of the shaft portion so as to radiate from the shaft portion. A wheel is fastened to the flange portions. The outer ring member is arranged radially outward of the outer periphery of the shaft portion of the inner ring member via an annular space. The rolling elements are rollably arranged in the annular space between the inner ring member and the outer ring member. There is a wheel rolling bearing device in which a plurality of flange portions is formed, by cold lateral extrusion, on the outer periphery of a shaft portion of an inner ring member so as to radiate from the shaft portion (for example, see Japanese Patent Application Publication No. 2006-111070 (JP 2006-111070 A)). In order to prevent entry of muddy water, or the like, from an outer-side opening (opening on the outer side in the vehicle lateral direction) of an annular space between the inner ring member and an outer ring member, a seal member is arranged between the inner periphery of an outer end portion (end portion on the outer side in the vehicle lateral direction) of the outer ring member and the outer periphery of a raceway shoulder portion of the inner ring member. The seal member usually includes a fixing portion and a seal lip. The fixing portion is formed at a radially outer side portion of the seal member, and is fixedly press-fitted to the inner periphery of an outer side portion of the outer ring member in the vehicle lateral direction. The seal lip is formed at a radially inner side portion of the seal member, and is in sliding contact with the outer periphery of the raceway shoulder portion of the inner ring member. In addition, in order to ensure sealing between the seal lip of the seal member and the outer periphery of the raceway shoulder portion of the inner ring member formed of a forging, the outer periphery of the raceway shoulder portion of the inner ring member is formed of a turned face formed by turning.

In the above-described wheel rolling bearing device, a distal end portion of the seal lip of the seal member is in sliding contact with the turned face of the outer periphery of the raceway shoulder portion of the inner ring member. Therefore, if the distal end portion of the seal lip abrades, poor sealing may occur.

SUMMARY OF THE INVENTION

It is an object of the invention to provide a wheel rolling bearing device in which sufficient sealing performance is maintained for a long period of time.

An aspect of the invention relates to a wheel rolling bearing device, including: an inner ring member where multiple flange portions, to which a wheel is fastened, are formed on an outer periphery of a shaft portion so as to radiate from the shaft portion; an outer ring member that is arranged radially outward of the outer periphery of the shaft portion of the inner ring member via an annular space; and a plurality of rolling elements that are rollably arranged in the annular space between the inner ring member and the outer ring member. The inner ring member is formed by cold forging. A tapered surface is formed in a state of a forged surface on the inner ring member so as to gradually increase in diameter from an inner side toward an outer side in a vehicle lateral direction over a region from a position near root portions of inner side faces of the flange portions in the vehicle lateral direction to a position radially outward of an outer periphery of an outer end portion of the outer ring member in the vehicle lateral direction. A seal member is attached to the outer periphery of the outer end portion of the outer ring member. A seal lip that is in sliding contact with the tapered surface in the state of a forged surface is formed at a distal end portion of the seal member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, example embodiments of the invention will be described with reference to the accompanying drawings.

Figure 1:
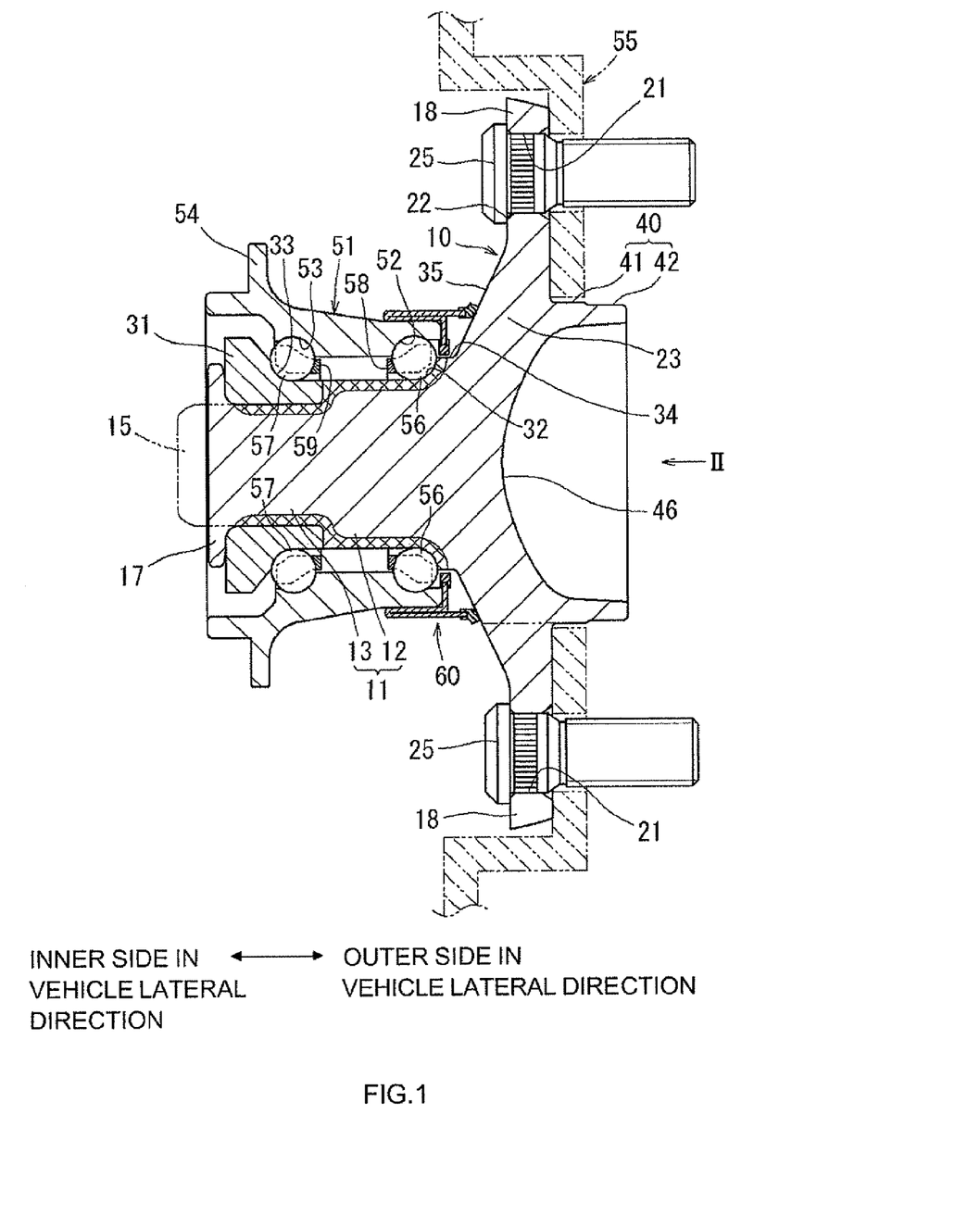
FIG. 1 is an axial sectional view that shows a wheel rolling bearing device according to a first embodiment of the invention.
Figure 2:
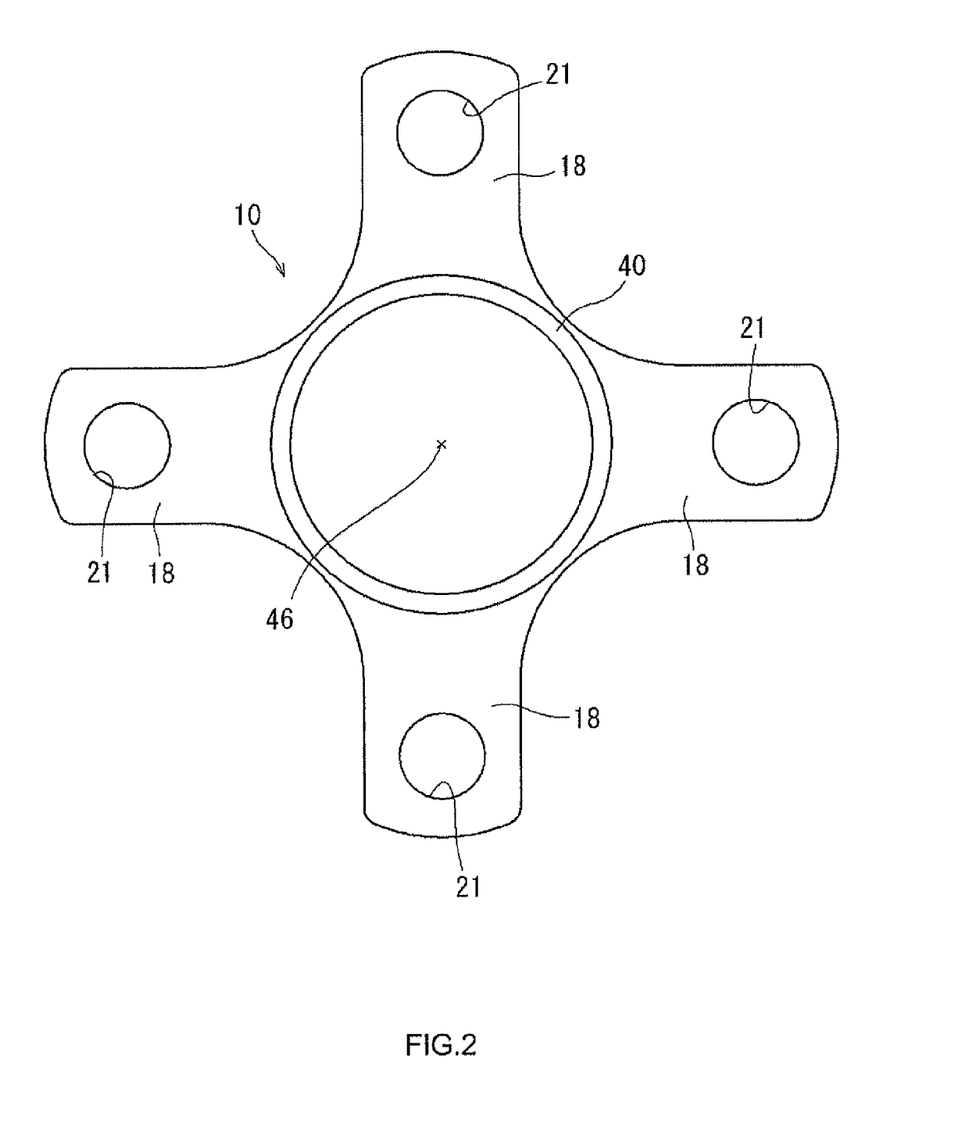
FIG. 2 is a view that shows an inner ring member according to the first embodiment as viewed from a forged recess side along an arrow II in FIG. 1.

A wheel rolling bearing device according to a first embodiment of the invention will be described with reference to FIG. 1 to FIG. 3. As shown in FIG. 1, the wheel rolling bearing device (wheel hub unit) is an assembly unit that includes an inner ring member 10, an outer ring member 51 and rolling elements 56, 57. The inner ring member 10 is formed by cold forging. The inner ring member 10 is a single-piece member that has a shaft portion 11, a fitting shaft portion 40, a flange base portion 23 and a plurality of flange portions 18. The flange portions 18 radiate from the outer periphery of the flange base portion 23 outward in the radial direction. The fitting shaft portion 40 is formed at one end of the shaft portion 11, and has a diameter larger than that of the shaft portion 11. The fitting shaft portion 40 is fitted in a center hole of a wheel (not shown). The flange base portion 23 is located between the shaft portion 11 and the fitting shaft portion 40.

Bolt holes 21 are formed so as to pass through the respective flange portions 18. Hub bolts 25 that are used to fasten the wheel are press-fitted in the respective bolt holes 21. The fitting shaft portion 40 has a brake rotor fitting portion 41 located adjacent to the flange portions 18. The brake rotor fitting portion 41 is fitted in a center hole of a brake rotor 55. A wheel fitting portion 42 is formed at a distal end portion of the fitting shaft portion 40. The wheel fitting portion 42 has a diameter slightly smaller than that of the brake rotor fitting portion 41. The wheel fitting portion 42 is fitted in the center hole of the wheel. A forged recess 46 is formed by cold forging at a center portion of an outer end face of the fitting shaft portion 40 in the vehicle lateral direction.

In the first embodiment, the shaft portion 11 of the inner ring member 10 is formed as a stepped shaft in which a portion on the flange portion 18 side is larger in diameter than a portion on the distal end side. Further, an inner ring raceway surface 32 that is on the outer side in the vehicle lateral direction is formed on the outer periphery of a large-diameter portion 12 of the shaft portion 11. An inner ring member 31 is fitted to the outer periphery of a small-diameter portion 13 of the shaft portion 11. The inner ring member 31 has on its outer periphery, an inner ring raceway surface 33 that is on the inner side of the inner ring raceway surface 32 in the vehicle lateral direction. Furthermore, a shaft end portion 15 having the same diameter as the small-diameter portion 13 is formed at a distal end portion of the shaft portion 11. A distal end portion of the shaft end portion 15 is clinched radially outward to form a clinched portion 17. In this way, the inner ring member 31 is fixed to the outer periphery of the small-diameter portion 13.

A tapered surface 35 is formed in the state of a forged surface so as to gradually increase in diameter from the inner side toward the outer side in the vehicle lateral direction over a region from a position near root portions of inner side faces of the flange portions 18 (inner side faces of the flange portions 18 in the vehicle lateral direction) to a position radially outward of the outer periphery of an outer end portion of the outer ring member 51 (outer end portion of the outer ring member 51 in the vehicle lateral direction) (described later). The root portions of the inner side faces of the flange portions 18 are located adjacent to a raceway shoulder portion 34 of the inner ring raceway surface 32 formed on the shaft portion 11 of the inner ring member 10. In the first embodiment, the tapered surface 35 is formed so as to gradually increase in diameter from the inner side toward the outer side in the vehicle lateral direction over a region from a position near the root portions of the inner side faces of the flange portions 18, which are located adjacent to the raceway shoulder portion 34, to a position close to bolt seat faces 22 of the flange portions 18.

Figure 3:
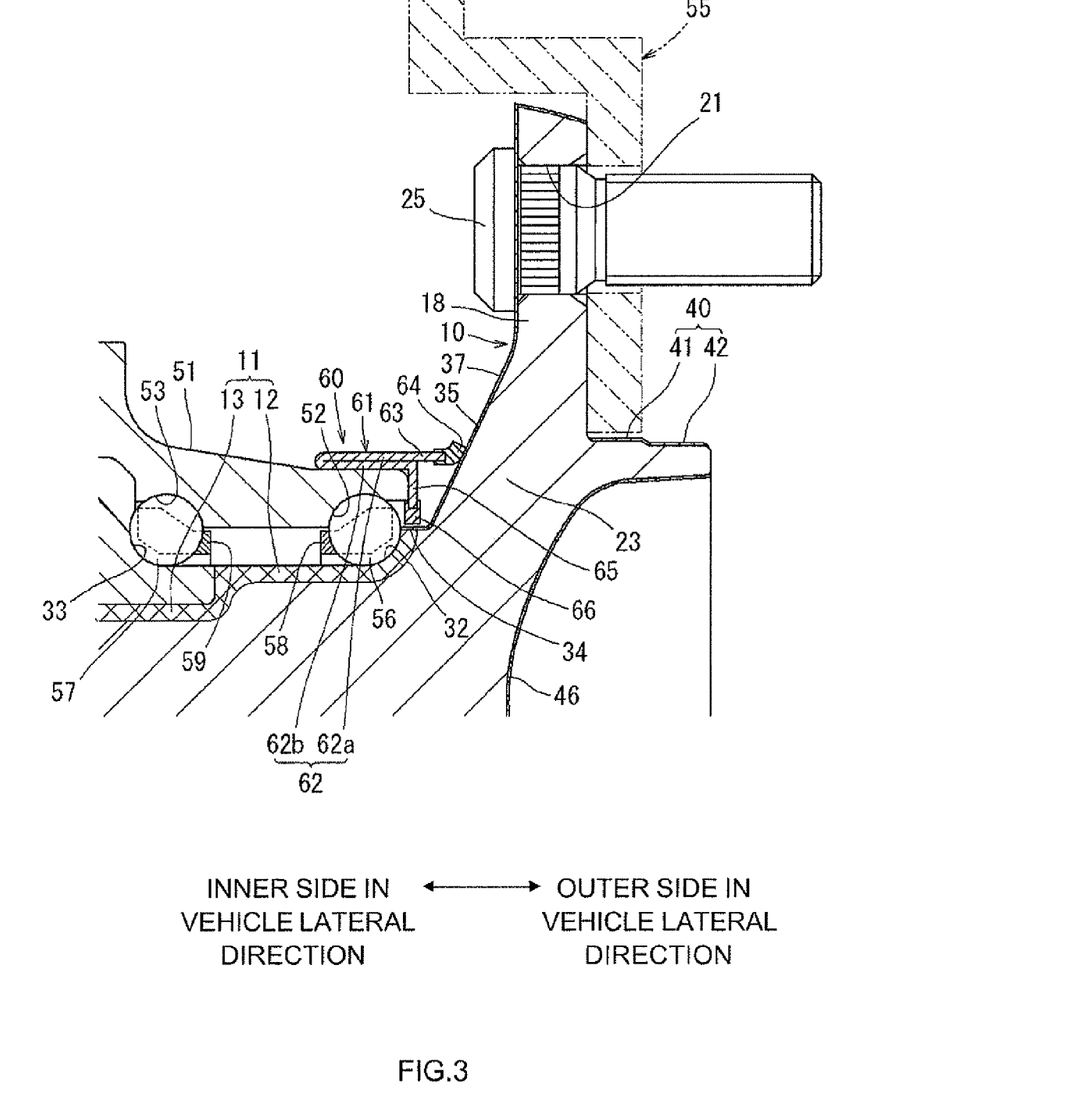
FIG. 3 is an enlarged axial sectional view that shows a shaft portion, a fitting shaft portion and a flange portion of the inner ring member according to the first embodiment.

In the first embodiment, as shown in FIG. 3, the outer periphery of the raceway shoulder portion 34, the tapered surface 35, and the entirety of the inner side faces of the flange portions 18 are covered with a lubricant coat 37. The lubricant coat (phosphate coat) 37 is formed as follows. In a coating process that is a preceding process before cold forging of the inner ring member 10, phosphate is applied onto the surface of a material that will be the inner ring member 10. Even after cold forging of the inner ring member 10, the outer periphery of the raceway shoulder portion 34, the tapered surface 35, and the entirety of the inner side faces of the flange portions 18 are in the state of a forged surface on which the lubricant coat 37 is left and which is not subjected to turning. After cold forging of the inner ring member 10, the inner ring raceway surface 32, part of the raceway shoulder portion 34, the outer periphery of the large-diameter portion 12, a step surface between the large-diameter portion 12 and the small-diameter portion 13 and the outer periphery of the small-diameter portion 13, which are indicated by hatching in FIG. 1, are subjected to turning, and then subjected to heat treatment (quenching). After that, the surface of the heat treated portion is subjected to grinding.

The outer ring member 51 is formed in a cylindrical shape, and is arranged radially outward of the outer periphery of the shaft portion 11 of the inner ring member 10 via an annular space, on the same central axis of the inner ring member 10. An outer ring raceway surface 52 and an outer ring raceway surface 53, which is on the inner side of the outer ring raceway surface 52 in the vehicle lateral direction, are formed on the inner periphery of the outer ring member 51 at axial positions that correspond to the inner ring raceway surface 32 and the inner ring raceway surface 33, respectively. The rolling elements 56 are rollably arranged between the inner ring raceway surface 32 and the outer ring raceway surface 52 with the rolling elements 56 retained by a cage 58. The rolling elements 57 are rollably arranged between the inner ring raceway surface 33 and the inner ring raceway surface 53 with the rolling elements 57 retained by a cage 59. Thus, a double row rolling bearing (angular contact ball bearing in FIG. 1) is formed.

A required axial preload based on a clinching force at the time of forming the clinched portion 17 by clinching the shaft end portion 15 of the shaft portion 11 is applied to the rolling elements (balls) 56 that are arranged between the inner ring raceway surface 32 and the outer ring raceway surface 52 and the rolling elements (balls) 57 that are arranged between the inner ring raceway surface 33 and the outer ring raceway surface 53. A fixing flange 54 is integrally formed with the outer periphery of the outer ring member 51. The fixing flange 54 is fastened to a fitting face of a vehicle body-side member, such as a knuckle and a carrier, with bolts. The vehicle body-side member is supported by a suspension (not shown) of a vehicle.

As shown in FIG. 3, a seal member 60 is attached to the outer periphery of the outer end portion of the outer ring member 51. A body portion of the seal member 60 is formed of a core metal 61. The core metal 61 has a cylindrical portion 62, a radially outer side extended portion 63 and a radially inner side annular portion 65. The cylindrical portion 62 is folded into inner and outer two layers and formed in a cylindrical shape, and is fixedly press-fitted to the outer periphery of the outer end portion of the outer ring member 51. The radially outer side extended portion 63 extends from an outer end portion of a radially outer side portion 62a (outer end portion of the radially outer side portion 62a in the vehicle lateral direction) of the cylindrical portion 62 toward the tapered surface 35. The radially inner side annular portion 65 is formed through bending so to extend radially inward from an outer end portion of a radially inner side portion 62b (outer end portion of the radially inner side portion 62b in the vehicle lateral direction) of the cylindrical portion 62. A base portion of a seal lip (axial lip) 64 is fixedly attached to a distal end portion of the radially outer side extended portion 63 by cure adhesion. The seal lip 64 has rubber elasticity and is in sliding contact with the tapered surface 35. A base portion of a seal lip (radial lip) 66 is fixedly attached to a radially inner end portion of the radially inner side annular portion 65 with a slight clearance left between the seal lip 66 and the outer periphery of the raceway shoulder portion 34 by cure adhesion. The seal lip 66 has rubber elasticity and forms a labyrinth in cooperation with the outer periphery of the raceway shoulder portion 34.

The wheel rolling bearing device according to the first embodiment is configured as described above. Therefore, the tapered surface 35 is formed in the state of a forged surface (forged surface on which the lubricant coat 37 is left) over a region from a position near the root portions of the inner side faces of the flange portions 18 of the inner ring member 10, which are formed by cold forging, to a position radially outward of the outer periphery of the outer end portion of the outer ring member 51, and, in the first embodiment, a region from the outer end portion of the raceway shoulder portion 34 to a position close to the bolt seat faces 22 of the flange portions 18. Therefore, it is possible to omit time and effort for turning the tapered surface 35 by turning. Due to the structure in which the distal end portion of the seal lip 64 of the seal member 60 is in sliding contact with the tapered surface 35 in the state of a forged surface, when the distal end portion of the seal lip 64 has abraded by a predetermined amount, the remaining portion of the seal lip 64 is in sliding contact with a portion of the tapered surface 35, which has a diameter smaller than that of a portion in contact with the seal lip 64 before occurrence of the abrasion. Therefore, it is possible to ensure sufficient sealing performance over a long period of time.

Next, a wheel rolling bearing device according to a second embodiment of the invention will be described with reference to FIG. 4 and FIG. 5. In the second embodiment, in order to achieve weight reduction while ensuring sufficient strength of an inner ring member 110, a stepped forged recess 146 is formed, by cold forging, so as to be deeper than the forged recess 46 described in the first embodiment. The forged recess 146 is formed at a center portion of an outer end face of a fitting shaft portion 140 (outer end face of the fitting shaft portion 140 in the vehicle lateral direction) of the inner ring member 110. A tapered surface 135 is formed in the inner ring member 110 as in the first embodiment so as to gradually increase in diameter from the inner side toward the outer side in the vehicle lateral direction over a region from a position near root portions of inner side faces of flange portions 118 (inner side faces of the flange portions 118 in the vehicle lateral direction) to a position close to bolt seat faces 122 of the flange portions 118. The root portions of the inner side faces of the flange portions 118 are located adjacent to a raceway shoulder portion 134 of an inner ring raceway surface 132 on the outer side in the vehicle lateral direction. A seal member that uses the tapered surface 135 of the inner ring member 110 as a sealing face as in the first embodiment is attached to the outer periphery of an outer end portion of an outer ring member (not shown) in the vehicle lateral direction.

Figure 4:
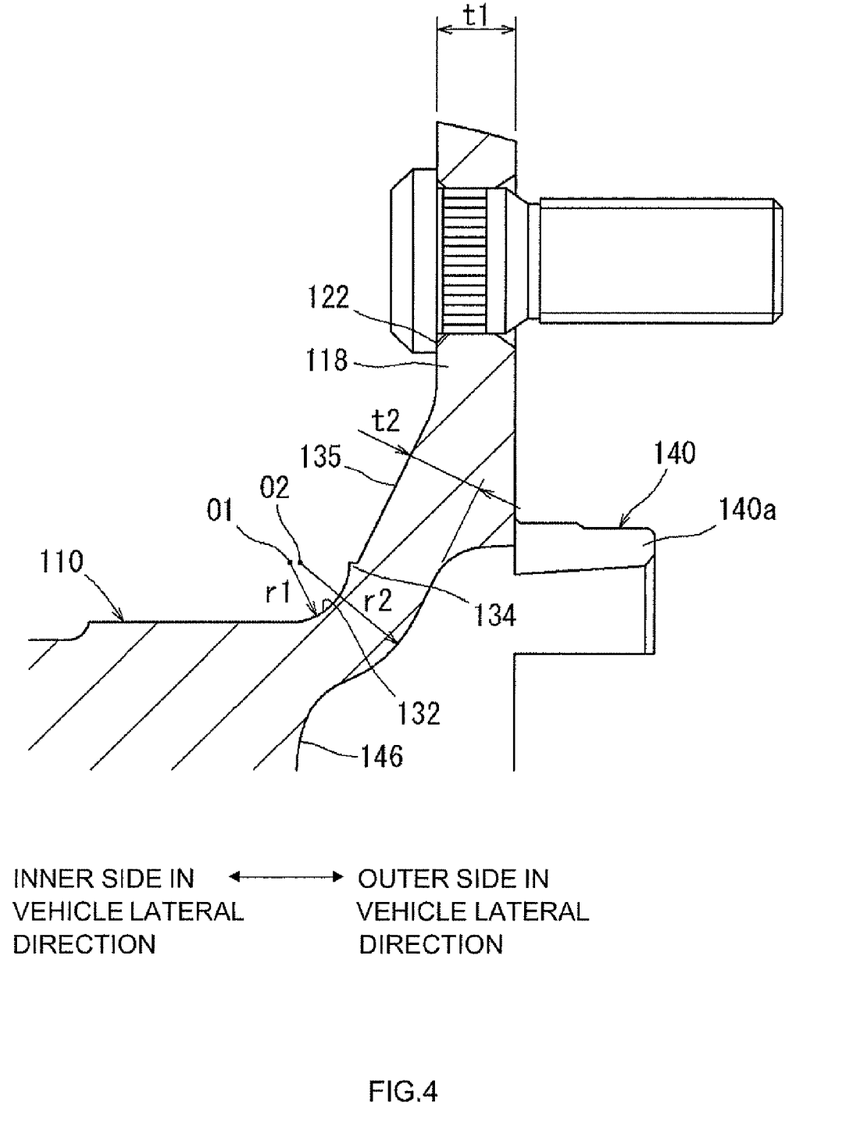
FIG. 4 is an enlarged axial sectional view that shows a shaft portion, a fitting shaft portion and a flange portion of an inner ring member of a wheel rolling bearing device according to a second embodiment of the invention.

Particularly, in the second embodiment, as shown in FIG. 4, where the thickness of each flange portion 118 is t1 and the thickness of a portion between the inner periphery of the forged recess 146 and the tapered surface 135 is t2, the relationship "t1≈t2" is satisfied. Where the curvature radius of the inner ring raceway surface 132 of the inner ring member 110 is r1 and the curvature radius of a portion of the inner periphery of the forged recess 146, which corresponds to an angular region defined by a center O1 of a circular arc of the inner ring raceway surface 132 and both ends of a circular arc range, is r2, the relationship "r1+t1≈r2" is satisfied. Note that a center O2 of the circular arc having the curvature radius r2 is set to a position near the center O1 of the circular arc r1 of the inner ring raceway surface 132 or a position that coincides with the center O1 of the circular arc having the curvature radius r1.

Figure 5:
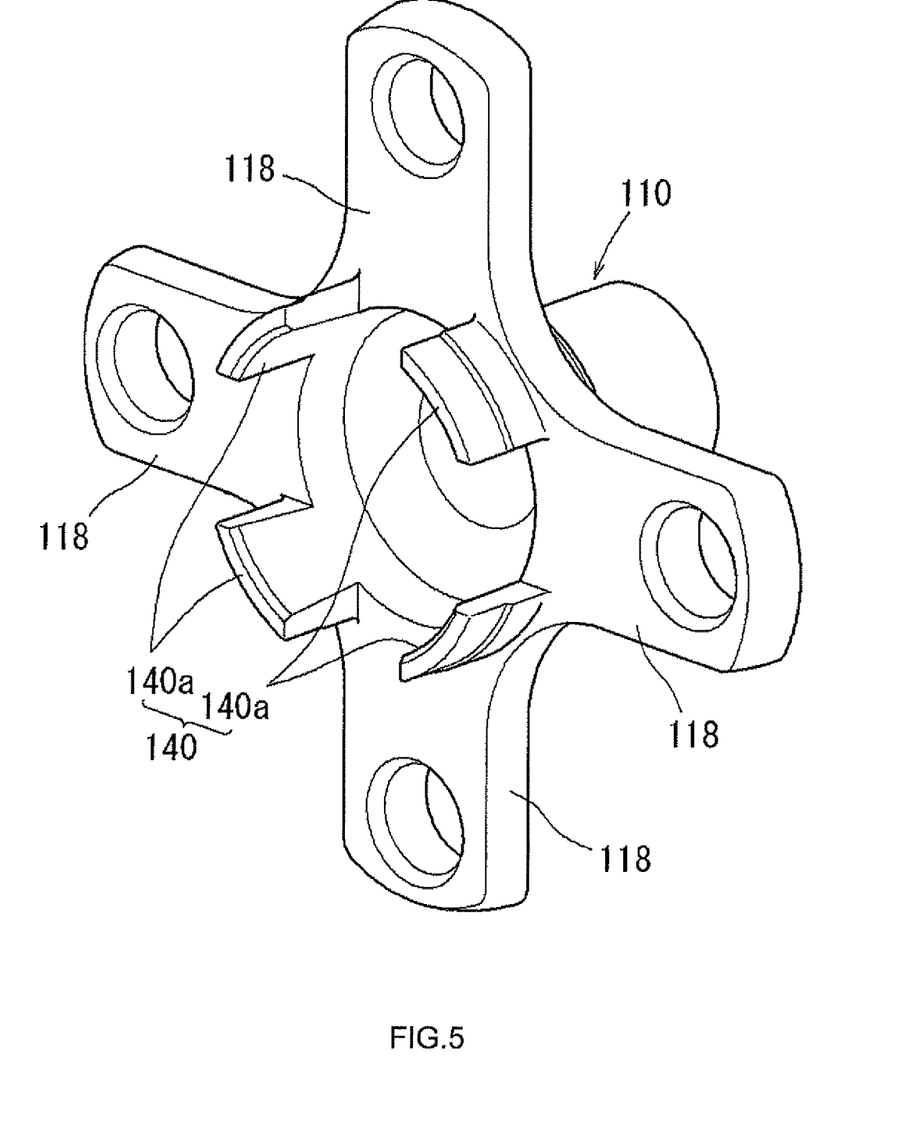
FIG. 5 is a perspective view that shows the inner ring member according to the second embodiment as viewed from the fitting shaft portion side.

In the second embodiment, as shown in FIG. 5, multiple circular arc portions 140a are formed at predetermined intervals (at predetermined intervals of the circumferential size of each flange portion 118) in the circumferential direction and are formed around the same center by cold forging. The circular arc portions 140a are formed only at portions at which there are no root portions of the flange portions 118, and are not formed at portions at which the root portions of the flange portions 118 are present, within the entire circumference of the fitting shaft portion 140 of the inner ring member 110. The circular arc portions 140a constitute the fitting shaft portion 140.

That is, in a configuration in which the fitting shaft portion is formed in a cylindrical shape, stress tends to concentrate on a coupling portion between the root portions of outer side faces of the flange portions (outer side faces of the flange portions in the vehicle lateral direction) and the fitting shaft portion. However, it is possible to prevent stress concentration on the coupling portion by not providing the fitting shaft portion 140 at the root portions of the outer side faces of the flange portions 118. Because the other configuration of the wheel rolling bearing device according to the second embodiment is similar to that in the first embodiment, the description thereof is omitted.

The wheel rolling bearing device according to the second embodiment is configured as described above. Thus, according to the second embodiment as well, similar operation and advantageous effects to those in the first embodiment are obtained. Particularly, in the second embodiment, where the thickness of each flange portion 118 is t1 and the thickness of the portion between the inner periphery of the forged recess 146 and the tapered surface 135 is t2, the relationship "t1≈t2" is satisfied. Thus, it is possible to suppress occurrence of a situation where the thickness of a portion at which the tapered surface 135 is formed becomes larger than the thickness of each flange portion 118 and the weight of the inner ring member 110 is increased.

Where the curvature radius of the inner ring raceway surface 132 of the inner ring member 110 is r1 and the curvature radius of a portion of the inner periphery of the forged recess 146, which corresponds to the angular region defined by the center O of the circular arc of the inner ring raceway surface 132 and both ends of the circular arc range, is r2, the relationship "r1+t1≈r2" is satisfied. Thus, it is possible to suppress occurrence of a situation where the thickness of the portion, which corresponds to the angular region defined by the center O of the circular arc of the inner ring raceway surface 132 and both ends of the circular arc range, becomes larger than the thickness of each flange portion 118 and the weight of the inner ring member 110 is increased.

Note that the invention is not limited to the above-described embodiments, and the invention may be implemented in various other embodiments without departing from the scope of the invention.

What is claimed is:

1. A wheel rolling bearing device, comprising:
an inner ring member where multiple flange portions, to which a wheel is fastened, are formed on an outer periphery of a shaft portion so as to radiate from the shaft portion;
an outer ring member that is arranged radially outward of the outer periphery of the shaft portion of the inner ring member via an annular space; and
a plurality of rolling elements that are rollably arranged in the annular space between the inner ring member and the outer ring member, wherein
an inclined portion is formed on the inner ring member so as to gradually increase in diameter from an inner side toward an outer side in a vehicle lateral direction over a region from a position adjacent to root portions of inner side faces of the flange portions in the vehicle lateral direction to a position radially outward of an outer periphery of an outer end portion of the outer ring member in the vehicle lateral direction, a seal member is attached to the outer periphery of the outer end portion of the outer ring member, a seal lip that is in sliding contact with the inclined portion is formed at a distal end portion of the seal member, a fitting portion to which a center hole of the wheel is fitted is formed at an outer end portion of the inner ring member in the vehicle lateral direction;

a forged recess is formed in an outer end face of the fitting portion in the vehicle lateral direction by forging, the forged recess including a circular arc, an inner ring raceway surface with a raceway shoulder portion is formed adjacent to the root portions of the flange portions formed on the outer periphery of the shaft action of the inner ring member, and where (i) a curvature radius of the inner ring raceway surface is r1 and (ii) a curvature radius of the circular arc of the forged recess is r2, wherein a center of the circular arc of the forged recess is set to a position adjacent to a center of a circular arc of the inner ring raceway surface, a relationship $r1+t1 \approx r2$ is satisfied, wherein a thickness of each of the flange portions is t1.

2. The wheel rolling bearing device according to claim 1, wherein:

the thickness of each of the flange portions t1 and a thickness of a portion between an inner periphery of the forged recess and the inclined portion t2 satisfy a relationship $t1 \approx t2$.

* * * * *